United States Patent [19]

Tsikos

[11] Patent Number: 4,979,815

[45] Date of Patent: Dec. 25, 1990

[54] LASER RANGE IMAGING SYSTEM BASED ON PROJECTIVE GEOMETRY

[76] Inventor: Constantine J. Tsikos, 65 Woodstone Dr., West Berlin, N.J. 08091-1049

[21] Appl. No.: 312,635

[22] Filed: Feb. 17, 1989

[51] Int. Cl.$^5$ .................. G01C 3/00; G01C 11/12; G09D 9/00

[52] U.S. Cl. .......................... 356/1; 356/2; 434/4

[58] Field of Search ............... 356/1, 2; 434/4

[56] References Cited

U.S. PATENT DOCUMENTS

| | | |
|---|---|---|
| 2,645,971 | 7/1953 | Herbst . |
| 2,786,096 | 3/1957 | Palmer ................... 178/6.8 |
| 3,361,912 | 1/1968 | Lundberg ............... 250/229 |
| 3,530,235 | 9/1970 | Bolton .................... 178/6.8 |
| 3,773,422 | 11/1973 | Stavis et al. ............ 356/156 |
| 3,796,492 | 3/1974 | Cullen et al. ............ 356/4 |
| 3,895,870 | 7/1975 | Cullen et al. ............ 356/1 |
| 3,975,102 | 8/1976 | Rosenfeld et al. ...... 356/167 |
| 4,070,683 | 1/1978 | Altshuler et al. ....... 354/77 |
| 4,089,608 | 5/1978 | Hoadley ................. 356/156 |
| 4,113,389 | 9/1978 | Kaye ..................... 356/164 |
| 4,165,178 | 8/1979 | Coumo, Jr. et al. .... 356/1 |
| 4,175,862 | 11/1979 | DiMatteo et al. ...... 356/375 |
| 4,294,541 | 10/1981 | Altshuler et al. ....... 356/376 |
| 4,294,544 | 10/1981 | Altschuler et al. ..... 356/376 |
| 4,391,514 | 7/1983 | Webster ................ 356/1 |
| 4,412,121 | 10/1983 | Kremers et al. ........ 219/124.34 |
| 4,443,705 | 4/1984 | DiMatteo et al. ...... 250/558 |
| 4,443,706 | 4/1984 | DiMatteo et al. . |
| 4,492,472 | 1/1985 | Asano et al. ........... 356/376 |
| 4,493,968 | 1/1985 | Brown .................. 219/124.34 |
| 4,498,778 | 2/1985 | White .................... 356/376 |
| 4,523,809 | 6/1985 | Taboada et al. ........ 350/163 |
| 4,541,721 | 9/1985 | Dewar ................... 356/375 |
| 4,541,722 | 9/1985 | Jenks .................... 356/376 |
| 4,625,107 | 11/1986 | Planke ................... 250/223 B |
| 4,639,140 | 1/1987 | Lerat ..................... 356/376 |
| 4,641,972 | 2/1987 | Halioua et al. ......... 356/376 |
| 4,645,348 | 2/1987 | Dewar et al. ........... 356/376 |
| 4,648,717 | 3/1987 | Ross et al. .............. 356/376 |
| 4,650,333 | 3/1987 | Crabb et al. ............ 356/376 |
| 4,653,316 | 3/1987 | Fukuhara ............... 73/146 |
| 4,657,394 | 4/1987 | Halioua .................. 356/376 |
| 4,672,562 | 6/1987 | Egli et al. ............... 364/559 |
| 4,687,326 | 8/1987 | Corby, Jr. .............. 356/5 |
| 4,701,047 | 10/1987 | Eibert et al. ............ 356/1 |
| 4,734,766 | 3/1988 | Shiozumi et al. ....... 358/106 |
| 4,741,621 | 5/1988 | Taft et al. ............... 356/376 |
| 4,764,016 | 8/1988 | Johansson .............. 356/371 |
| 4,791,482 | 12/1988 | Barry et al. ............ 358/107 |
| 4,845,373 | 7/1989 | Jamieson et al. ....... 356/400 |
| 4,847,510 | 7/1989 | Douglas ................. 357/371 |
| 4,847,687 | 7/1989 | McDonnell et al. .... 356/4 |

OTHER PUBLICATIONS

Proceedings of the 1986 International Symposium on Microelectronics—Oct. 6-8-1986—pp. 57-64.
"A Psdueo-Interferometric Laser Range Finger for Robot Applns", by Srinivasan et al., *Robotics and Automation*, Feb. 1989, vol. 5, pp. 98-105.

(List continued on next page.)

*Primary Examiner*—Charles T. Jordan
*Assistant Examiner*—Rochelle Lieberman
*Attorney, Agent, or Firm*—Karl F. Milde, Jr.

[57] ABSTRACT

A range imaging system, and a method for calibrating such a system are based on the principles of projective geometry. The system comprises four subsystems: (1) a laser and a cylindrical lens or vibrating mirror for producing a planar beam of light; (2) an electronic camera equipped with a lens and an appropriate interference filter; (3) an electronic circuit for height (depth) measurements and video image generation; and (4) a scanning mechanism for moving the object with respect to the light beam and the camera so as to scan an area of the object surface. The system is calibrated by determining the position in the electronic image of the object surface at three different heights. The range image is generated from these three known heights from either a previously determined look-up table, or from a calculation based on the invariance of the cross-ratio, a well known ratio from projective geometry.

87 Claims, 11 Drawing Sheets

OTHER PUBLICATIONS

Range Image Processing Turorial, Besl, GM Research Labs, Jun. 1988.

"Determining of Surface Properties by Projecting a Stripe Pattern", by Asada et al., Eighth Int'l Conference on Pattern Recognition, France—Oct. 27–31, 1986.

Forming Models of Plane and Cylinder Faceted Bodies from Light Stripls by Popplestone et al., Advance Papers of the Fourth Int's Joint Conf. on Artificial Intelligence, USSR, Sep. 1975, vol. 2.

High-Speed Space Encoding Projectors for 3D Imaging by Rosenfeld et al., Optics, Illumination and Image Sensing for Machine Vision, Oct. 1986, Cambridge, Mass., vol. 728.

Movable Light-Stripe Sensor for Obtaining Three-Dimensional Coordinate Measurements by Agin et al, Robotics and Industrial Inspection, Aug. 1982, San Diego, Calif., vol. 360.

Three Dimensional Inspection Using Structured Light by Jalkio et al., Optical Engineering, Dec. 1985, vol. 24.

Laser Range Finder for Robot Control and Inspection by Parthasarathy et al., Robot Vision, May 1982, Arlington, Va., vol. 336.

Vision System with Ranging for Maneuvering in Space by Cathey et al., Optical Engineering, Jul. 1966, vol. 25.

Imaging System with Range to Each Pixel by Cathey et al., Journal of the Optical Society of America A–Optics and Image Science, Sep. 1986, vol. 3.

A Three-Dimensional Sensor Based on Structured Light by Mundy et al., Three-Dimensional Machine Vision.

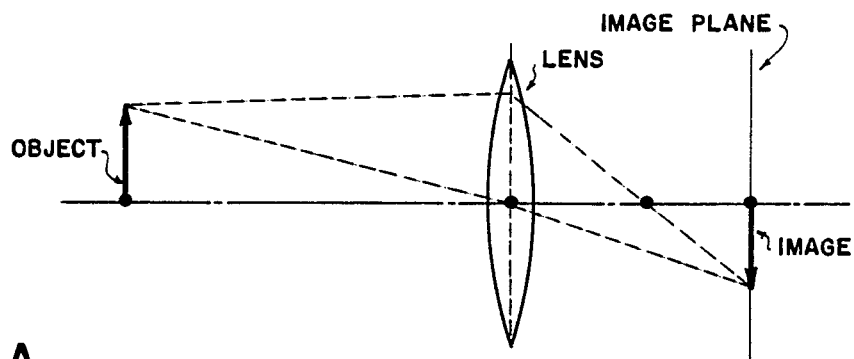
FIG.1A: THE GENERAL CAMERA MODEL
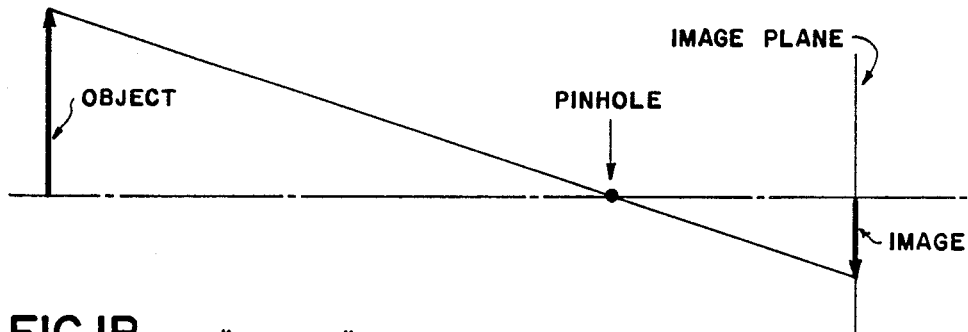
FIG.1B: THE "PINHOLE" CAMERA MODEL
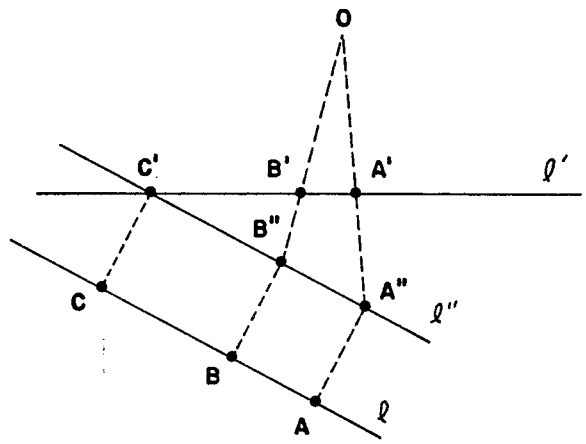
FIG.2: THREE POINTS UNDER PROJECTION A  B    C    D
CROSS-RATIO: $(ABCD) = \dfrac{\dfrac{(CA)}{(CB)}}{\dfrac{(DA)}{(DB)}}$
FIG.3: CROSS-RATIO DEFINITION
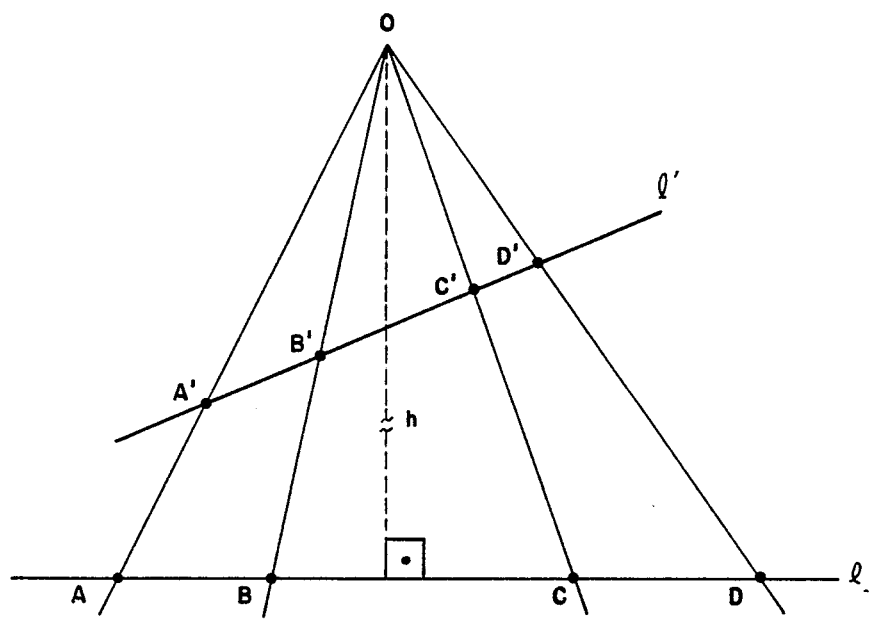
FIG.4: INVARIANCE OF CROSS-RATIO UNDER CENTRAL PROJECTION.
$(ABCD) = \dfrac{\dfrac{(CA)}{(CB)}}{\dfrac{(DA)}{(DB)}} = \dfrac{\dfrac{(C'A')}{(C'B')}}{\dfrac{(D'A')}{(D'B')}} = (A'B'C'D')$

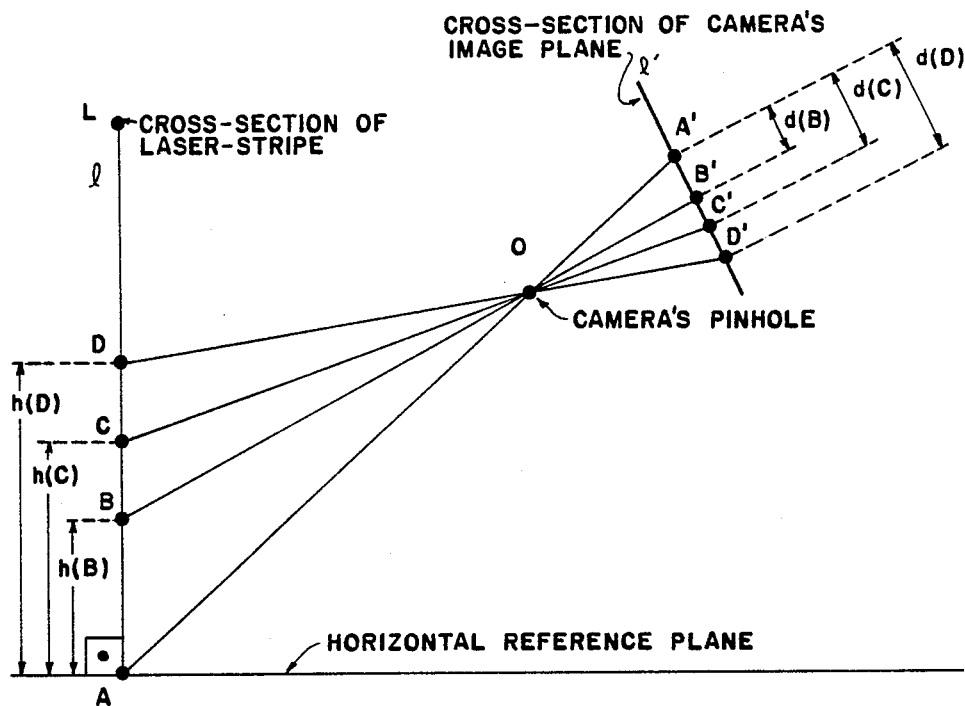
$$h(C) = (CA) = (C'A') \frac{(CB)(D'B')(DA)}{(C'B')(DB)(D'A')} = \text{HEIGHT AT POINT C}$$
FIG. 5: USE OF CROSS-RATIO FOR HEIGHT COMPUTATION IN THE CASE: h(A)=d(A)=0.
IN THIS FIGURE THE HEIGHTS OF POINTS A,B AND D ARE KNOWN AND h(A)=0. THE UNKNOWN IS THE HEIGHT OF C.

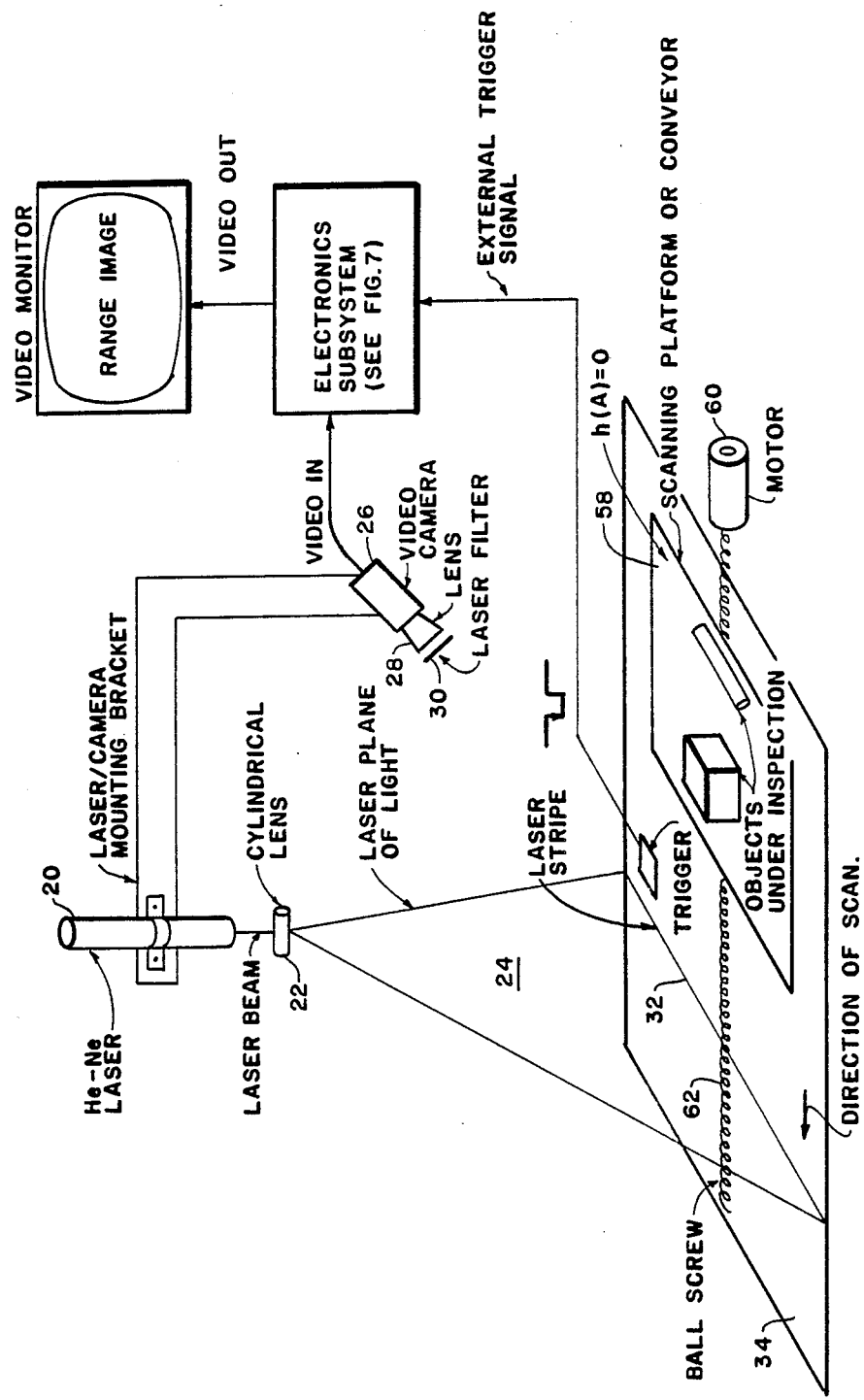
FIG.6: LASER RANGE IMAGING SYSTEM BLOCK DIAGRAM

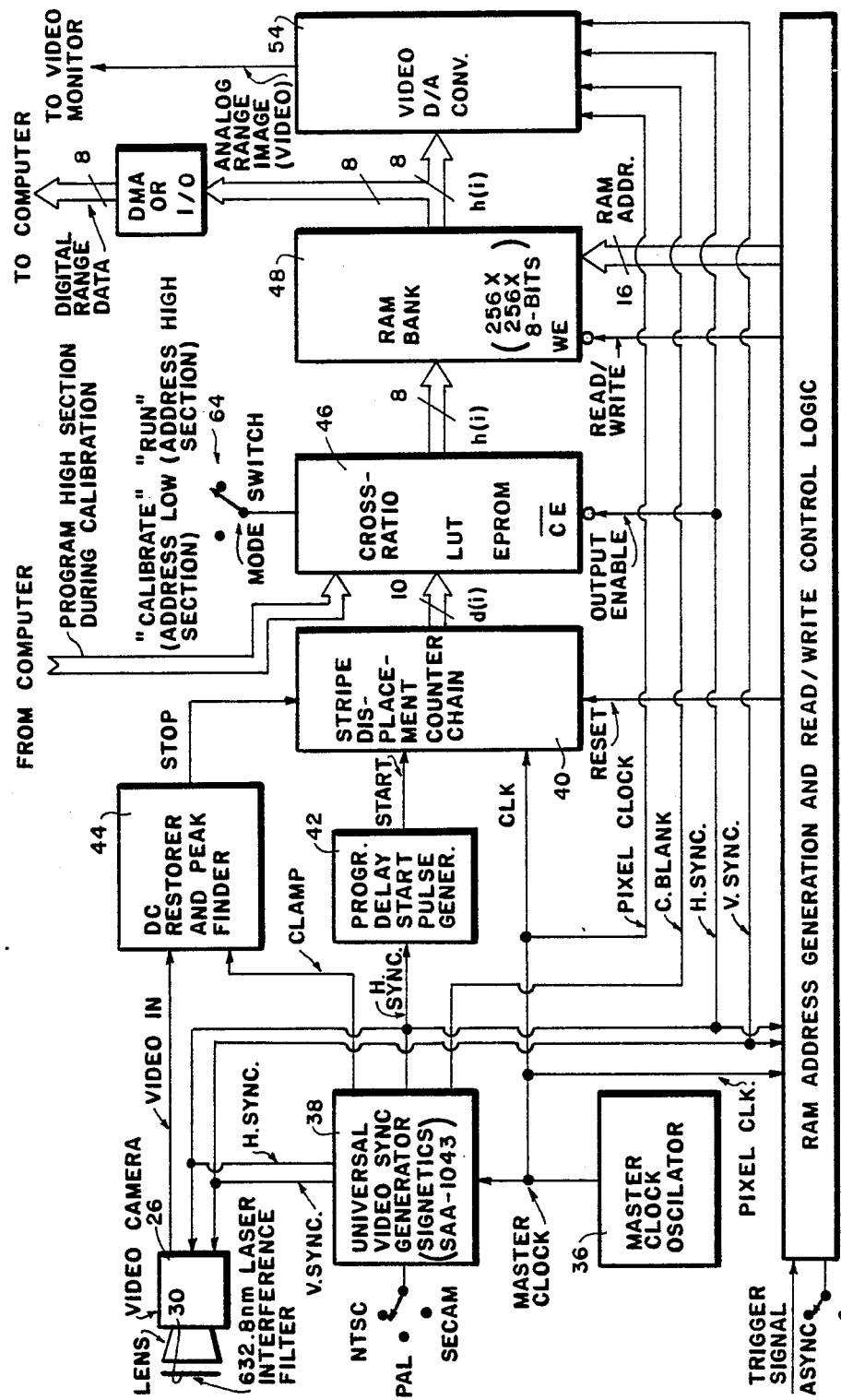
FIG.7: THE ELECTRONICS SUBSYSTEM BLOCK DIAGRAM

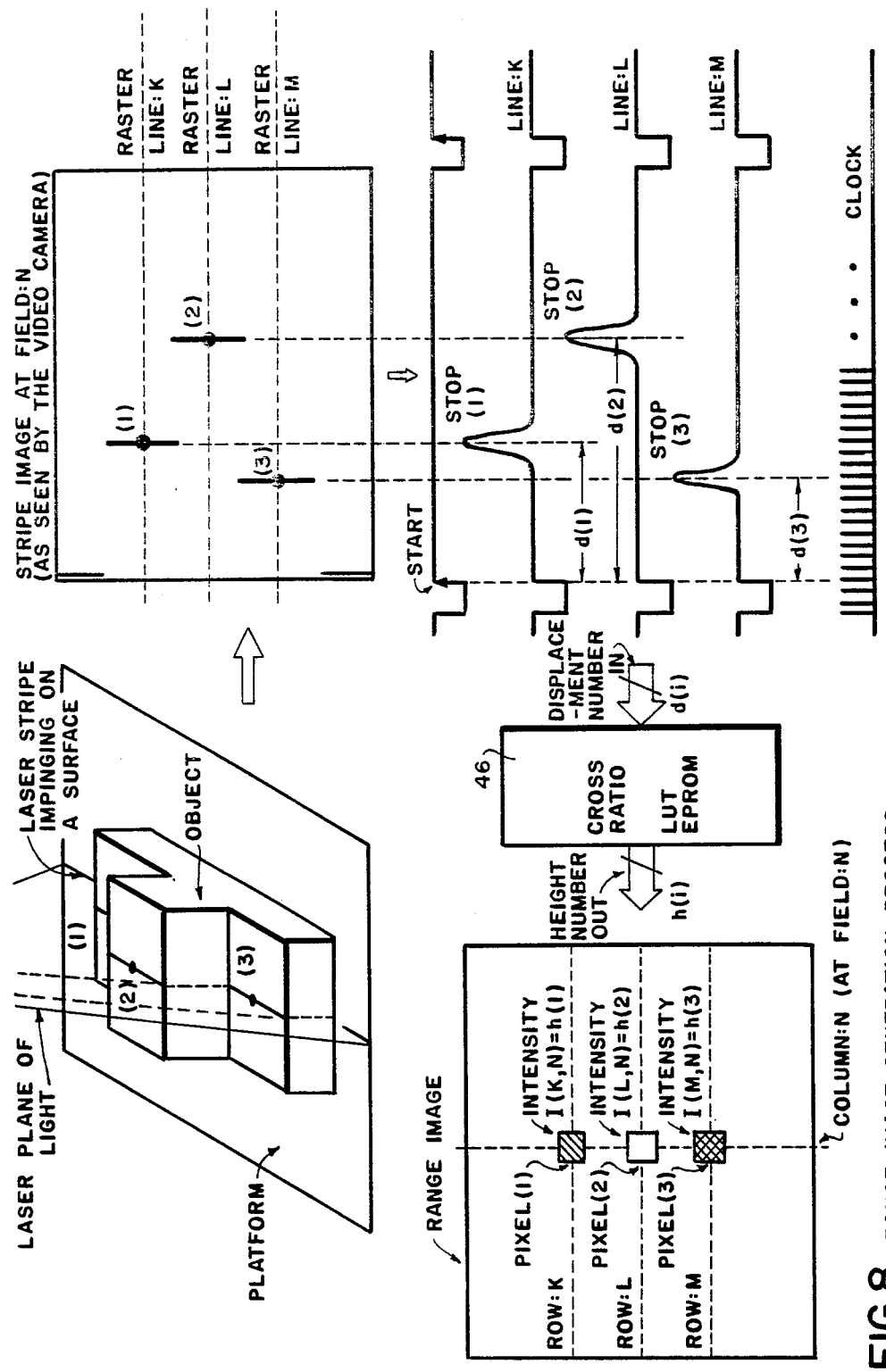
FIG. 8: RANGE IMAGE GENERATION PROCESS

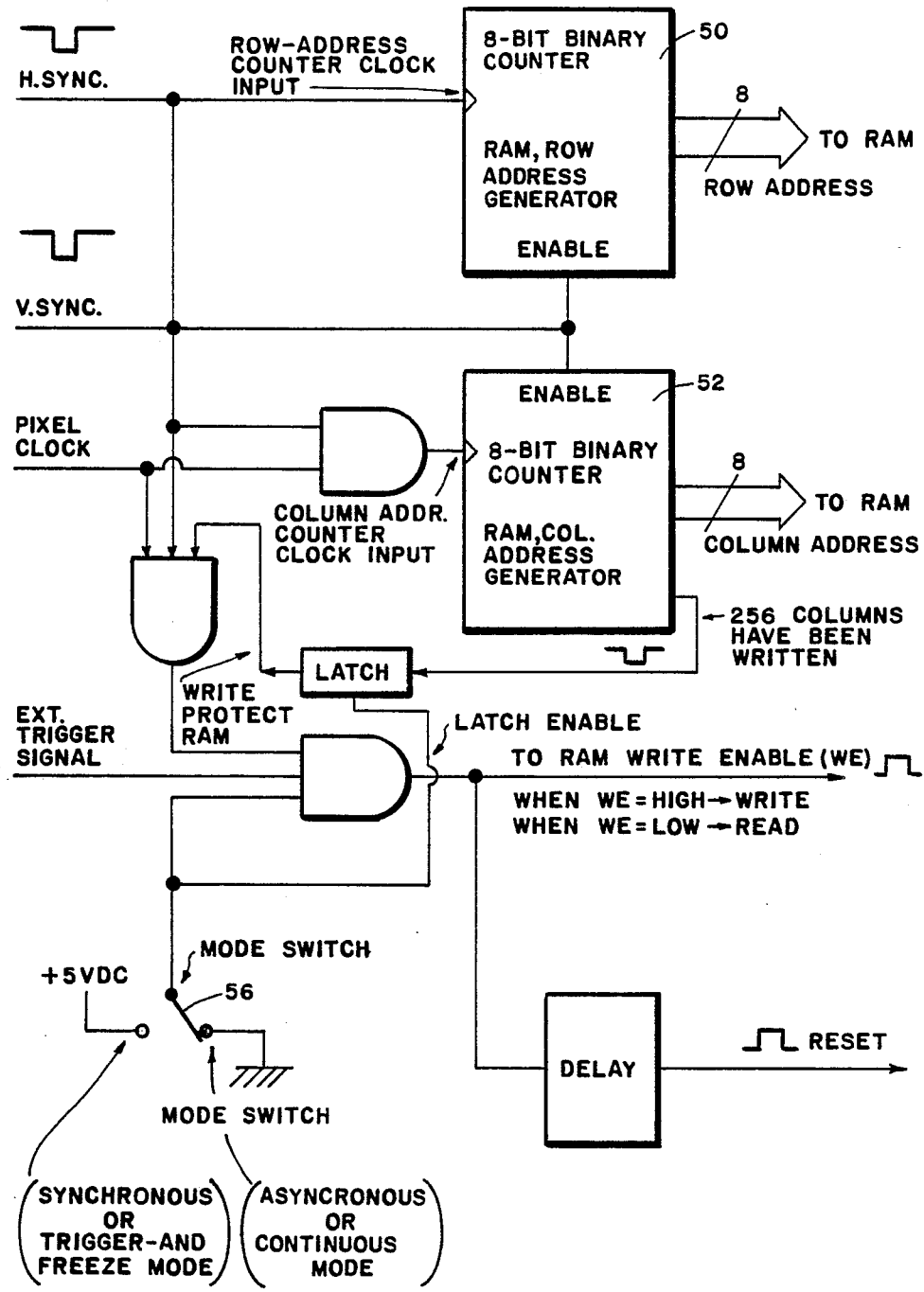
FIG.9: RAM ADDRESS GENERATION AND READ/WRITE CONTROL LOGIC.

| d(i) h(i) → DATA → ADDRESS ↓ | MSB D7 | D6 | D5 | D4 | D3 | D2 | D1 | LSB D0 | |
|---|---|---|---|---|---|---|---|---|---|
| X X X 0 0 | 0 | 0 | 0 | 0 | 0 | 0 | 0 | 0 | → DATA = 0 |
| X X X 0 1 | 0 | 0 | 0 | 0 | 0 | 0 | 0 | 1 | → DATA = 1 |
| X X X 0 2 | 0 | 0 | 0 | 0 | 0 | 0 | 1 | 0 | → DATA = 2 |
| X X X 0 3 | 0 | 0 | 0 | 0 | 0 | 0 | 1 | 1 | → DATA = 3 |
| X X X 0 4 | 0 | 0 | 0 | 0 | 0 | 1 | 0 | 0 | → DATA = 4 |
| ⋮ | | | | | | | | | |
| X X X 7 F | 0 | 1 | 1 | 1 | 1 | 1 | 1 | 1 | → DATA = 127 |
| ⋮ | | | | | | | | | |
| X X X F E | 1 | 1 | 1 | 1 | 1 | 1 | 1 | 0 | → DATA = 254 |
| X X X F F | 1 | 1 | 1 | 1 | 1 | 1 | 1 | 1 | → DATA = 255 |
| X X 1 0 0 | 0 | 0 | 0 | 0 | 0 | 0 | 0 | 0 | → DATA = 0 |
| X X 1 0 1 | 0 | 0 | 0 | 0 | 0 | 0 | 1 | 0 | → DATA = 2 |
| X X 1 1 0 | 0 | 0 | 0 | 0 | 0 | 0 | 1 | 1 | → DATA = 3 |
| X X 1 7 F | 0 | 1 | 1 | 0 | 0 | 1 | 0 | 0 | → DATA = 96 (FOR ILLUSTRATION PURPOSES ONLY) |
| X X 1 F E | 1 | 1 | 1 | 1 | 1 | 1 | 0 | 0 | → DATA = 253 |
| X X 1 F F | 1 | 1 | 1 | 1 | 1 | 1 | 1 | 1 | → DATA = 255 |

LOW SECTION (addresses X X X 0 0 through X X X F F)
HIGH SECTION (addresses X X 1 0 0 through X X 1 F F)

FIG.10: AN EXAMPLE OF THE CONTENTS OF THE LUT EPROM.

FIG.11: THE CALIBRATION TARGET
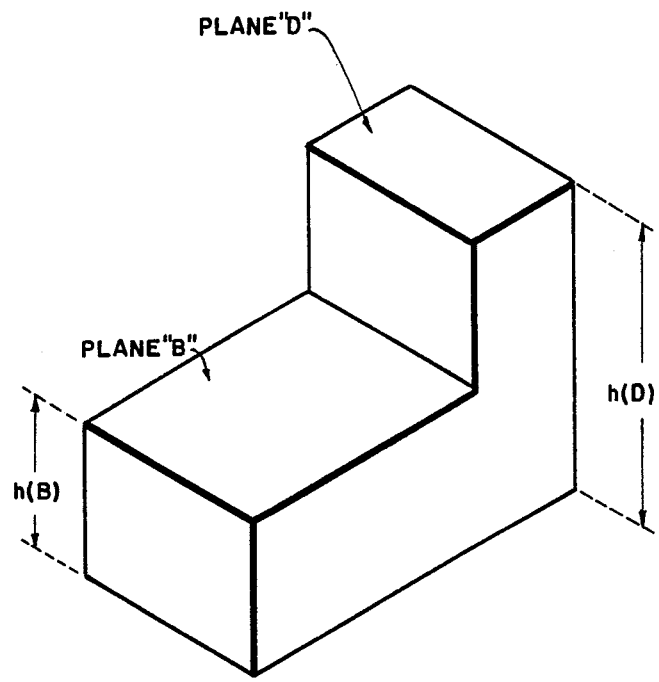
FIG.12: CORRECT PLACEMENT OF CALIBRATION TARGET ON THE SCANNING PLATFORM.
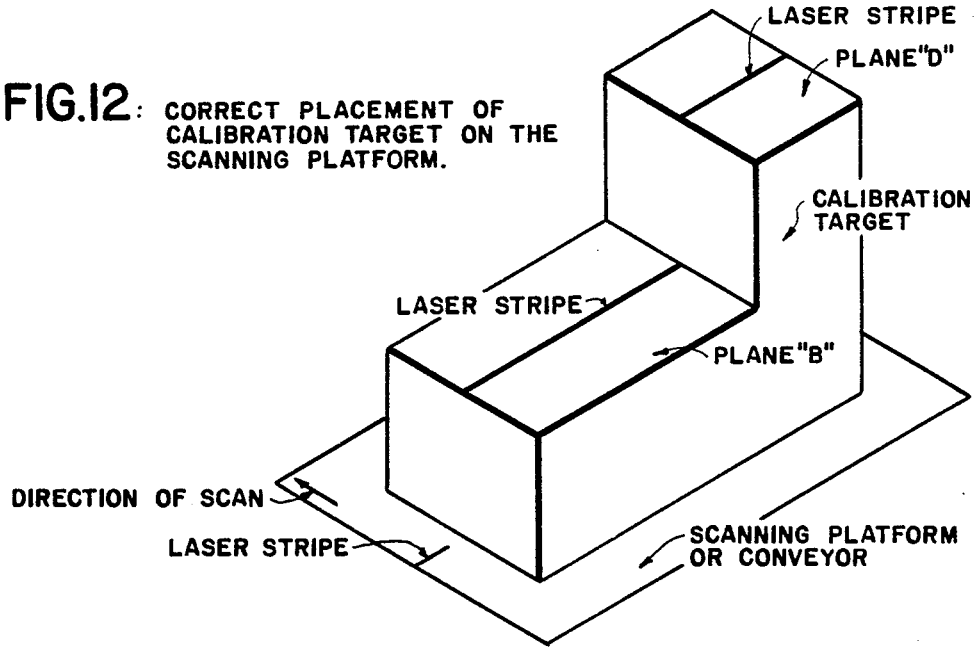

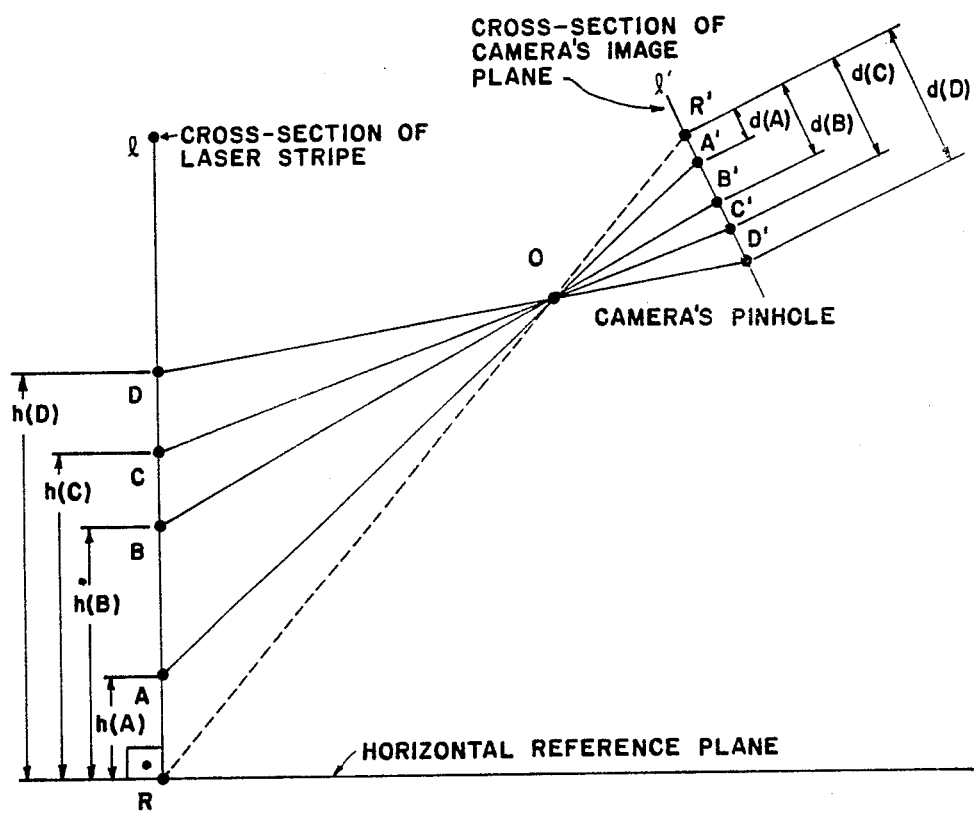
FIG.13: USE OF CROSS-RATIO FOR HEIGHT COMPUTATION IN THE GENERAL CASE WHERE: $\begin{pmatrix} h(A) \neq 0 \\ d(A) \neq 0 \end{pmatrix}$.
NOTE: IN THIS FIGURE THE HEIGHTS OF POINTS A,B & D ARE KNOWN; $h(A) \neq 0$. THE UNKNOWN IS THE HEIGHT OF C.

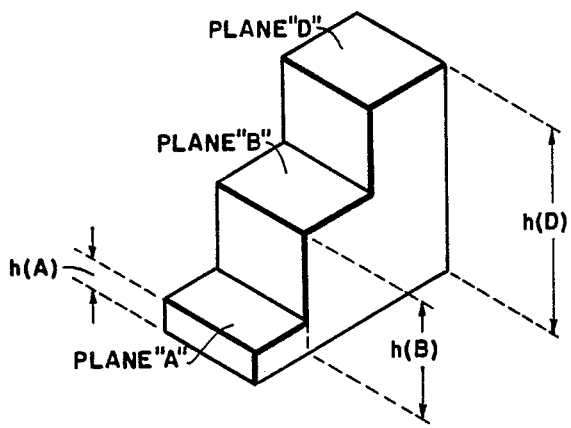
FIG. 14: THE GENERALIZED CALIBRATION TARGET (FOR THE GENERALIZED CALIBRATION PROCEDURE)
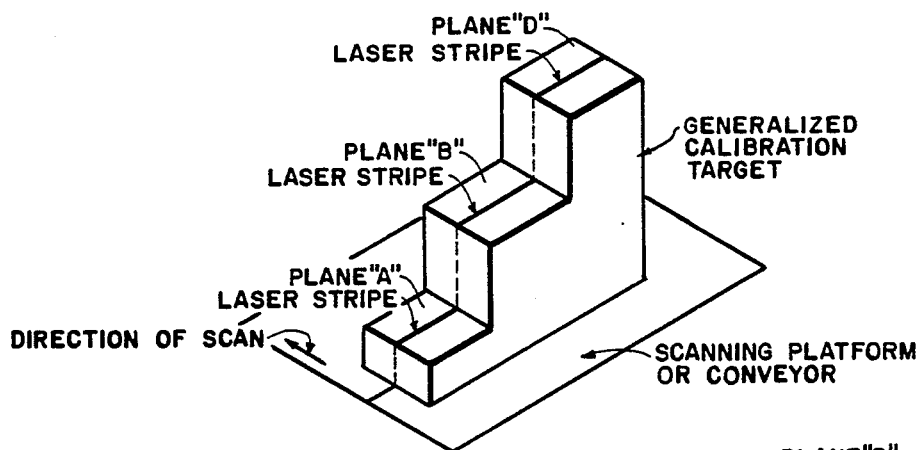
FIG. 15: CORRECT PLACEMENT OF THE GENERALIZED CALIBRATION TARGET ON THE SCANNING PLATFORM
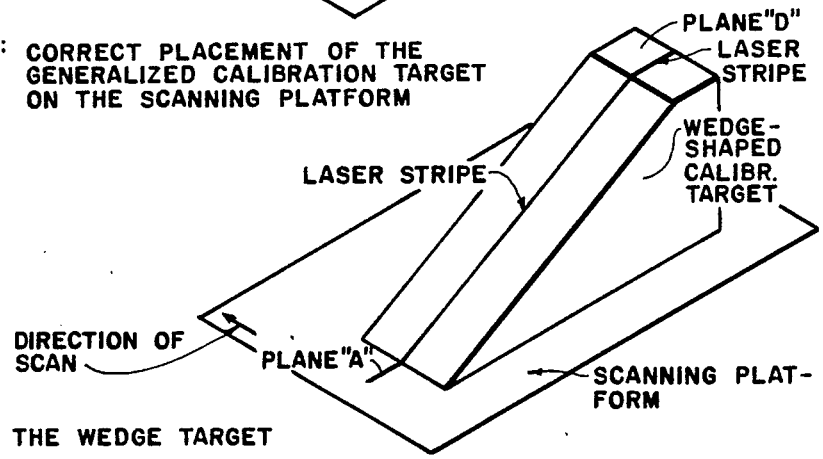
FIG. 16: THE WEDGE TARGET

LASER RANGE IMAGING SYSTEM BASED ON PROJECTIVE GEOMETRY

BACKGROUND OF THE INVENTION

The present invention relates to a system (both method and apparatus) for producing a "range image" of an area of the surface of an object, and a method for calibrating a system of this type. More particularly, the present invention relates to a range imaging system, and a method for calibrating the system, which are based on the principles of projective geometry.

Active, optical range imaging systems collect three dimensional coordinate data from visible object surfaces in a scene. These systems can be used in a wide variety of automation applications, including shape acquisition, bin picking, robotic assembly, inspection, gauging, mobile robot navigation, automated cartography, medical diagnosis (biostereometrics) and automated military applications. The range imaging sensors in such systems are unique imaging devices in that the image data points explicitly represent seen surface geometry as sampled surface points.

Range images are known by many other names depending on the context For example, range images have been referred to, variously, as a range map, depth map, 3-D image, 2.5-D image, digital terrain map (DTM), topographic map, surface profile, XYZ point list, surface distance matrix, contour map, and surface height map. Many techniques are known in the art for obtaining range images, but most active optical techniques are based on one of the following five principles:

(1) Radar measures "time of flight" transmission time to and from an object surface. The transmitted energy may be electromagnetic radiation or sonic waves. The transmitted energy may be pulsed, a continuous wave or an amplitude or frequency modulated wave.

(2) Triangulation measures two interior angles, angle AB and angle BC, and the baseline B of a triangle ABC, and then determines the length A and C from the viewing apparatus to the object surface. Basically, either the ambient light reflected from the object surface may be viewed from two angles, on opposite ends of the base line, or light may be projected onto the object's surface from one end of the base line and viewed or detected from the opposite end of the baseline. The light projected may be "structured" as a single point, straight line, multiple points, multiple lines, grid, circle or the like.

(3) The Moire method and holographic interferometry both use interference phenomena to determine the distance to an object surface. With Moire, one amplitude-modulated spatial signal (e.g. reflected light from a scene) is multiplied by another amplitude modulated spatial signal (the viewing grating) to create an output signal with surface depth information encoded as a phase difference. In holographic interferometry, coherent light from two separate laser beams, focused at a common surface point, is added and the surface depth is encoded in the detected phase difference.

(4) Lens focusing determines the distance to a point on an object surface viewed through a lens that is in focus. Similarly, with Fresnel diffraction of coherent light passed through a diffraction grating, exact in-focus images of the grating are formed at regular, periodic distance intervals whereas the grating images are out of focus in a predictable manner between the end points of these intervals.

(5) Stadimetry determines the distance to an object surface from the size of the image in a viewed scene. This technique requires that the size of the object be recognized and compared to the size of the viewed image.

All of the techniques heretofore known for producing range images require complex mechanical/optical/electronic means for implementation. Furthermore, the use of these techniques normally requires that the viewing geometry and dimensions, or in the case of stadimetry the object geometry and dimensions, be known in advance. Furthermore, complex calculations are normally required to produce the range image so that the range imaging apparatus is relatively costly.

SUMMARY OF THE INVENTION

It is a principal object of the present invention to provide a range imaging system (both method and apparatus), capable of producing a range image of an area of the surface of an object, which system is substantially simpler and less costly than range imaging systems known in the art.

It is a further object of the present invention to provide a range imaging system which is based or the principles of projective geometry.

It is a further object of the present invention to provide a range imaging system which uses the invariance of the so-called "cross-ratio" under central projection to determine the height of an object surface at a plurality of points.

It is a further object of the present invention to provide a simple method of calibration for a range imaging system.

It is a further object of the present invention to provide a range imaging system which is compatible with any video standard and may thus be interfaced with any video system or "frame-grabber" circuit board.

It is a further object of the present invention to provide a range imaging system which makes digital range data available in a system memory, for access by a computer via parallel I/O, or direct Memory Access (DMA).

It is a further object of the present invention to provide a range imaging system which is capable of operation in an asynchronous mode, wherein the image is constantly generated and updated, and in a synchronous or "trigger-and-freeze" mode in which the system operation is synchronized with, or triggered by, an external event.

These objects, as well as further objects which will become apparent from the discussion that follows, are achieved, according to the present invention, by:

(a) projecting a substantially planar light beam onto an object surface to illuminate the surface along a light stripe;

(b) viewing the object surface, as illuminated by the light beam, at an angle with respect to the plane of the light beam, and converting the viewed image into an image representation thereof which is divided into a plurality of picture scan elements;

(c) determining the relative positions, within the image representation, of the scan elements thereof corresponding to the light stripe on the object surface;

(d) determining the height of the object surface at a plurality of points along the light stripe; and (e) moving the object with respect to the planar light beam so as to scan an area of the object surface with the light beam.

The calibration method, according to the present invention, comprises the steps of:

(a) viewing a target object having a surface with at least three known heights h(A), h(B) and h(C) at different points A, B and C, and producing an electronic representation of the target object which is divided into a plurality of picture scan elements; and (b) determining the relative positions, d(A), d(B) and d(C), within the electronic representation of the scan elements thereof, of the object surface at the known heights h(A), h(B) and h(C).

For a full understanding of the present invention, reference should now be made to the following detailed description of the preferred embodiments of the invention and to the accompanying drawings.

BRIEF DESCRIPTION OF THE DRAWINGS

FIG. 1a is a representational diagram of a general camera model.

FIG. 1b is a representational diagram of a pinhole camera model.

FIG. 2 is a representational diagram showing three points under projection.

FIG. 3 is a diagram giving the cross-ratio or anharmonic ratio definition.

FIG. 4 is a representational diagram illustrating the invariance of the cross-ratio under central projection.

FIG. 5 is a representational diagram illustrating the use of the cross-ratio for height computation from one zero height [h(A)=0] and two non-zero heights [h(B) and h(D)].

FIG. 6 is a partly perspective, partly representational diagram of a laser range imaging system according to the preferred embodiment of the present invention.

FIG. 7 is a block diagram showing the camera subsystem and the electronics subsystem in the laser range imaging system of FIG. 6.

FIG. 8 is a representational diagram illustrating the operation of the laser range imaging system of FIG. 6.

FIG. 9 is a block diagram of the RAM address generation and read/write control logic in the electronics subsystem of FIG. 7.

FIG. 10 is a memory map diagram containing an example of the contents of the LUT EPROM in the electronics subsystem of FIG. 7.

FIG. 11 is a perspective view of a simple calibration target which may be used in the calibration of the range imaging system of FIG. 6, wherein the height h(A) equals zero.

FIG. 12 is a perspective view illustrating the correct placement of the calibration target of FIG. 11 on the scanning platform in the range imaging system of FIG. 6.

FIG. 13 is a representational diagram illustrating the use of the cross ratio for height computation from three non-zero heights h(A), h(B) and h(D)).

FIG. 14 is a perspective view of a simple, generalized calibration target which may be used in the calibration of the range imaging system of FIG. 6, wherein the height h(A) is non-zero.

FIG. 15 is a perspective view illustrating the correct placement of the calibration target of FIG. 14 on the scanning platform in the range imaging system of FIG. 6.

FIG. 16 is a perspective view of a simple calibration target which may be used in the calibration of the range imaging system of FIG. 6 to determine the height at each possible point.

DESCRIPTION OF THE PREFERRED EMBODIMENTS

The range imaging system according to the present invention is based on the invariance of the cross-ratio, a well known ratio from projective geometry. The theoretical background of the invention will first be explained; the preferred embodiment of the invention will be described immediately thereafter.

A. THEORETICAL BACKGROUND

The "pinhole" model for a camera will be used without loss of generality in the following explanation. In particular, it will be assumed that the camera can be approximated by a pinhole and that the image is formed onto the camera's image plane under a central projection. FIG. 1 shows a conventional lens camera in FIG. 1A and the pinhole camera in FIG. 1B.

Just as the length of a line segment is the key to metric geometry, there is one fundamental concept of projective geometry in terms of which all projective properties of figures can be expressed. This concept—namely, the invariance of the so-called "cross-ratio'—'—forms the basis of the present invention.

If three points A, B, C lie on a straight line, a projection will in general change not only the distances AB and BC but also the ratio AB/BC. In fact, any three points A, B, C on a straight line 1 can always be coordinated with any three points A', B', C' on another line 1' by two successive projections, as is illustrated in FIG. 2. To do this, the line 1' is rotated about the point C' until it assumes a position 1" parallel to 1. Then line 1 is projected onto 1' by a projection parallel to the line joining C and C', thus defining three points A", B" and C" (where C"=C'). The lines joining A', A", and B', B" will intersect at a point O, which is chosen as the center of a second projection. Therefore, a parallel and a central projection can coordinate any three points on a line 1 with any three points on a line 1'.

As has been just shown, no quantity that involves only three points on a line can be invariant under projection. The decisive discovery of projective geometry is the fact that if we have four points A, B, C, D on a straight line and project these onto A', B', C', D', as shown in FIG. 3, then there is a quantity, called the "cross-ratio" of the four points, that remains invariant under projection. This is a mathematical property of a set of four points on a line that is not destroyed by projection and that can be recognized in any image of the line.

Cross-Ratio Definition and Proof of Invariance

The cross-ratio is neither a length, nor a ratio of two lengths, but the ratio of two such ratios. Consider for example, four points on a line A, B, C, D. Given the ratios CA/CB and DA/DB, their cross-ratio (ABCD) is given by:

$$(ABCD) = \frac{\frac{(CA)}{(CB)}}{\frac{(DA)}{(DB)}} \quad \text{(Cross-ratio definition).} \quad [1]$$

By definition, (ABCD) is the cross-ratio of the four points A, B, C, D taken in that order. It will now be proven that the cross-ratio of four points is invariant under projection.

Theorem (from Projective Geometry): If A, B, C, D and A', B', C', D' are corresponding points on two lines related by a projection, then:

$$(ABCD) = \frac{\frac{(CA)}{(CB)}}{\frac{(DA)}{(DB)}} = (A'B'C'D') = \frac{\frac{(C'A')}{(C'B')}}{\frac{(D'A')}{(D'B')}} \quad [2]$$

Proof: The area of the triangles shown in FIG. 4 may be computed as follows:

$$\text{area}(OCA) = \tfrac{1}{2} * h * (CA) = \tfrac{1}{2} * (OA) * (OC) * \sin(COA) \quad [2a]$$

$$\text{area}(OCB) = \tfrac{1}{2} * h * (CB) = \tfrac{1}{2} * (OB) * (OC) * \sin(COB) \quad [2b]$$

$$\text{area}(ODA) = \tfrac{1}{2} * h * (DA) = \tfrac{1}{2} * (OA) * (OD) * \sin(DOA) \quad [2c]$$

$$\text{area}(ODB) = \tfrac{1}{2} * h * (DB) = \tfrac{1}{2} * (OB) * (OD) * \sin(DOB) \quad [2d]$$

Substituting [2a], [2], [2c] and [2d] into equation [2] yields:

$$(ABCD) = \frac{\frac{(CA)}{(CB)}}{\frac{(DA)}{(DB)}} = \frac{(CA)*(DB)}{(CB)*(DA)} =$$

$$\frac{(OA)*(OC)\sin(COA)}{(OB)*(OC)*\sin(COB)} * \frac{(OB)*(OD)*\sin(DOB)}{(OA)*(OD)*\sin(DOA)} =$$

$$\frac{\sin(COA) * \sin(DOB)}{\sin(COB) * \sin(DOA)}$$

Hence the cross-ratio of A, B, C, D depends only on the angles subtended at O by the segments joining A, B, C, D. Since these angles are the same for any four points A', B', C', D' into which A, B, C, D may be projected from O, it follows that the cross-ratio remains invariant under projection. QED.

B. USE OF CROSS-RATIO FOR REAL-TIME RANGE IMAGE GENERATION

Referring now to FIG. 5, line 1 represents the cross-section of a laser plane of light normal to the horizontal plane. Line 1' represents the cross-section of a camera's image plane. Point O represents the camera's center of lens. Point L represents the laser source. Considering now the four points on line 1, point A is the intersection of the laser line with the horizontal reference plane and represents a point of minimum height visible by the camera. Point B represents an arbitrary point whose distance from the horizontal plane is known, or can be measured. Point C represents a point on a surface whose height is to be determined. Finally, point D represents a point of maximum height visible by the camera.

The heights of points A, B and D are known, or can be accurately physically measured. In this example, the height of point A is set equal to zero. The height of the arbitrary point C is the unknown. Points A', B', C', D' represent the images of the points A, B, C, D, respectively, onto the camera's image plane under central projection from the camera's center of lens (i.e., point O).

In particular, the displacements (in pixels) of the points A', B', and D' are known or can be accurately measured during calibration. In this example, the displacement of point A' is set equal to zero. The displacement of point C' is accurately determined in real time. The unknown height of point C is computed by solving for CA in the cross-ratio equation:

$$\frac{\frac{(CA)}{(CB)}}{\frac{(DA)}{(DB)}} = \frac{\frac{(C'A')}{(C'B')}}{\frac{(D'A')}{(D'B')}} \quad [4]$$

Solving for CA yields the height of point C:

$$(CA) = (C'A') * \frac{(CB)*(D'B')*(DA)}{(C'B')*(DB)*(D'A')} \quad [5]$$

The following substitutions will now be made:

$(CA) = h(C)$ (height at point C)   [6]

$(CB) = h(C) - h(B)$ (height difference between points C and B)   [7]

$(DA) = h(D)$ (height at point D)   [8]

$(DB) = h(D) - h(B)$ (height difference between points D and B)   [9]

$(C'A') = d(C)$ (displacement of point C in the image)   [10]

$(C'B') = d(C) - d(B)$ (displacement difference between C and B)   [11]

$(D'A') = d(D)$ (displacement of point D in the image)   [12]

$(D'B') = d(D) - d(B)$ (displacement difference between D and B)   [13]

Substituting [6], [7], [8], [9], [10], [11], [12] and [13] into equation [5] yields:

$$h(C) = d(C) * \frac{[h(C)-h(B)]*[d(D)-d(B)]*h(D)}{[d(C)-d(B)]*[h(D)-h(B)]*d(D)} \quad [14]$$

Solving for h(C) yields:

$$h(C) = \quad [15]$$

$$\frac{d(C)*h(B)*h(D)*[d(D)-d(B)]}{[d(C)*h(D)*[d(D)-d(B)]] - [[(d(C)-d(B)]*[h(D)-h(B)]*d(D)]}$$

In equation [15] the unknown height of point C, i.e. h(C), is independent of the geometry (i.e. the base-line distance between camera and laser, laser angle, camera angle). Furthermore h(C) is independent of camera parameters (i.e. lens focal length, and the distance between the center of lens and the image plane). Instead, the unknown height h(C) is a function of one variable, d(C), and four constants: h(B), h(D), d(B), and d(D).

During calibration of the range imaging system according to the present invention, the constants h(B), h(D), d(B), and d(D) are measured. During range image generation, the system measures d(C) in real time and computes h(C); i.e., the unknown height at point C.

C. THE LASER RANGE IMAGING SYSTEM

The laser range imaging system, according to the preferred embodiment of the present invention, comprises four subsystems: (1) a laser and a cylindrical lens or vibrating mirror for producing a planar beam of light; (2) an electronic camera equipped with a lens and an appropriate interference filter; (3) an electronic circuit for height (depth) measurements and video image generation; and (4) a scanning mechanism (for example, a linear or rotary conveyor, or a robot manipulator with the laser/camera apparatus attached to the robot wrist). This range imaging system is illustrated generally in FIG. 6.

The Laser Subsystem: In the best mode of practicing the invention a 5 mW Helium-Neon (HeNe) laser light source 20, emitting at 632.8 nanometers, is employed to produce a pencil light beam. A cylindrical lens 22, or an oscillating or rotating mirror, are preferably used to spread the laser beam into a plane of light 24 as indicated in FIG. 6. The oscillating or rotating mirror, if used, are provided with means for oscillating or rotating the mirror surface. The cylindrical lens, if used, has a cylinder axis which intersects and is transverse to the pencil beam.

The Camera Subsystem: In the best mode the camera subsystem is comprised of a B/W, CCD video camera 26, with gen-lock capability, a 16 mm lens 28, and a 632.8 nm laser interference filter 30 mounted in front of the lens. The purpose of the interference filter is to block cut ambient light and to allow only the laser light to be seen by the camera. The camera is oriented and mounted so that the image of the laser stripe 32, caused by the plane of light 24 incident onto the horizontal plane 34, is seen by the camera as a vertical straight line. The viewing axis of the camera is arranged at an angle in the range of 10°–80° with respect to the plane of the light beam. This arrangement is shown in FIG. 8.

The Electronics Subsystem: The best mode of the electronics subsystem is illustrated in detail in FIG. 7. As is shown there, a master clock oscillator 36 drives a video sync generator 38 to generate the vertical and horizontal sync signals for the camera and a control logic. In addition, the master clock oscillator clocks a stripe displacement counter chain 40 to count the displacement, in pixels, of the light stripe from the edge of the scanned image.

For each horizontal raster line the horizontal sync pulse is delayed in a start pulse generator 42 by a (camera dependent) programmable amount of time. This delayed pulse labeled "start" enables the counter chain. Counting continues until a significant peak in the video signal is detected by a signal peak finder 44. When this occurs, counting stops.

Instead of a signal peak finder the electronic subsystem can be provided with a signal threshold device, such as a Schmitt Trigger, or a signal centroid determining device for determining the presence and center of the video pulse representing the light stripe. The threshold device can be made variable, if desired, to adjust to the best signal threshold level.

The counter now contains a number d(i) which is the number of pixels that the light stripe, as "seen" by the camera, is displaced in the camera's image plane at the point "i". This operation is illustrated in FIG. 8.

This number d(i) (for example, d(1), d(2), d(3), in FIG. 8) is used as an address to the cross-ratio LUT (Look Up Table) EPROM 46 which linearizes the space and converts displacement numbers into height (or distance). The generation of the LUT is described hereinbelow.

The data from the LUT is stored in a RAM 48 as a height number h(i). As is shown in FIG. 8, d(1) becomes h(1), d(2) becomes h(2), and so on. During the horizontal sync pulse the RAM row address counter 50 (FIG. 9) is incremented by one. During a TV field time of 16.67 ms, a total of 240 points are computed (one for each horizontal raster line) and are stored in a 256×256×8 RAM as a column of consecutive height numbers. In other words, the system generates one cross-section of the surface under inspection every 16.67 ms.

Simultaneously, the data from the entire RAM bank is supplied to an 8-bit video D/A converter to generate a standard RS-170 or CCIR video signal. This signal can be displayed on a monitor or can be digitized by an external machine vision system. The video image is a picture of the RAM contents. The higher the height value at a point, the brighter the image on the video display at that point In other words, the image intensity will be proportional to height. This range image generation process is illustrated in FIG. 8.

As shown in FIG. 9, two eight-bit binary counters 50 and 52 are used to generate the RAM's row and column addresses. The RAM bank always contains a window of the last 256 cross sections. Older cross sections are overwritten as new height data is coming in. In other words the RAM behaves as a non-recirculating, two-dimensional shift register.

The system has two modes of operation. In the asynchronous mode, selected via a mode switch 56 shown in FIG. 9, d(i) data is constantly written in RAM. In the synchronous mode, an external trigger signal allows only the next 256 columns of h(i) data to be written into the RAM. The RAM then becomes write-protected until the next external trigger pulse arrives. This mode allows synchronization to an external event and preservation of height data d(i) for further inspection and processing.

The Scanning Subsystem: One best mode of the scanning subsystem according to the invention is shown in FIG. 6. This subsystem comprises a scanning platform or conveyor 58 driven by a motor 60 and screw 62. However, this subsystem is highly user dependent Preferably the laser range imaging system of the invention uses a fixed laser/camera geometry, where the laser and camera subsystems are mounted on a common support. To generate a range image, either the scene is linearly translated under a stationary laser/camera, or the laser/camera is linearly translated over a stationary scene. Rotational cross-sections can be easily generated by replacing the linear translator with a rotating mechanism. Dense or sparse cross-sections can be generated by varying the speed of the scanning mechanism. Generation of true aspect ratio images requires the use of a simple servo loop to control the velocity of the scanning mechanism.

D. CALIBRATION PROCEDURE AND LOOK-UP TABLE GENERATION

The Look-Up Table is stored in an Electrically Programmable Read Only Memory (EPROM 46). The address space of the EPROM is divided into two sections, low and high, as shown in FIG. 10. The user selects a memory section via a mode switch, which is indicated in FIG. 7. Only one section can be selected at any time. When the mode switch 64 is in the "CALIBRATE" position the low section is selected. When the mode switch is in the "RUN" position, the high section is selected.

The low section of the LUT EPROM is a linear, one-to-one mapping between the displacement values d(i) and the height values h(i); i.e., h(i)=d(i). The high section of the EPROM is a non-linear mapping between the displacement values d(i) and the height values h(i); i.e., the high section of the LUT EPROM contains solutions to equation [15]. Substituting d(i) for d(C) into equation [15], and assuming d(A)=h(A)=0, h(i) becomes:

$$h(i) = \frac{d(i)*h(B)*h(D)*[d(D)-d(B)]}{[d(i)*h(D)*[d(D)-d(B)]]-[[d(i)-d(B)]*[h(D)-h(B)]*d(D)]} \quad [16]$$

The calibration procedure consists of the following steps:

1. The electronics subsystem is switched into the "CALIBRATE" mode. This selects the low section of the LUT EPROM.
2. The laser is oriented perpendicular to the scanning platform (or conveyor).
3. The camera is oriented so that the laser stripe appears as a straight vertical line on the leftmost side of the monitor. More specifically, in this step the camera is aligned so that zero displacements d(i)=0, correspond to zero heights h(i)=0; i.e., the intensity of the generated range image is zero (i.e. black picture).
4. A two step, parallel plane calibration target is constructed as shown in FIG. 11. The top plane and the lower plane of the target are designated as D and B, respectively. The lengths h(D) and h(B) in some units of length (e.g. millimeters) are then measured as shown in FIG. 11 and stored in a computer. It is recommended that the target be constructed so that h(D) covers the camera's field of view, that is, so that the laser stripe on the top plane D will be imaged onto the right-most pixels in the camera's image plane. The length h(B) should preferably be about half the size of h(D).
5. The target is placed on the scanning platform (or conveyor) as illustrated in FIG. 12. A complete range image is then generated (requiring about 4.27 seconds). This image is digitized using a commercially available image digitizer or "frame-grabber" board.
6. The displacement of any point lying on the top plane D of the target is determined, and this value is saved in the low section of the LUT EPROM as the value of d(D). The displacement of any point lying on the lower plane B of the target is then determined and this value is saved as the value of d(B). Assuming an 8-bit digitizer, the maximum value of d(D) will be 256.
7. The following Look-Up Table generator program is then run on the computer to generate the high section of the LUT EPROM contents:

```
BEGIN              /*Begin the Look-Up Table generation program      */
  h(D) = Measured physical height of plane D.     /* from step 4    */
  h(B) = Measured physical height of plane B.     /* from step 4    */
  d(D) = Measured displacement of plane D.        /* from step 6    */
  d(B) = Measured displacement of plane B.        /* from step 6    */
  d(i) = 1/*           Initialize d(i). Calculate h(i) using Eq. [16]  */ d(i)*h(B)*h(D)*[d(D)−d(B)]
  h(i) = ─────────────────────────────────────────────────────
         [d(i)*h(D)*[d(D)−d(B)]]−[[d(i)−d(B)]*[h(D)−h(B)]*d(D)]

PRINT "EPROM ADDRESS" = d(i), "EPROM DATA " = h(i) /* Print       */
  d(i) = d(i) + 1  /* Increment the calulation loop counter          */
  IF d(i)<257 THEN /* Check if all 256 entries computed              */
    GOTO 10  /* If not, go back and calculate another entry          */
  ELSE                                              /* Otherwise    */
    STOP                          /* Stop, and exit from the loop   */
END                        /* End the Look-Up Table generation program */
```

The above program prints a list of EPROM addresses and the corresponding EPROM data at each address. This list is passed to a commercially available EPROM Programmer Device to program the high section of the LUT EPROM as is illustrated in FIG. 10.

E. GENERALIZED SOLUTION

It will be understood that the cross-ratio equations [15] and [16] employed with the laser range imaging system described above assume that the lowermost height h(A) is equal to the minimum intensity (O or black image) and the displacement at this height d(A) is also zero. This simplification is not necessary, of course, for operation of the range imaging system. Set forth below is a generalized solution of the cross-ratio formula which includes the variables h(A) and d(A).

Referring to FIG. 13, equation [5] is repeated here for completeness:

$$(CA) = (C'A') * \frac{(CB)*(D'B')*(DA)}{(C'B')*(DB)*(D'A')} \quad [5]$$

The following substitutions will now be made:

$(CA) = h(C) - h(A)$ (Height difference between points C, A)     [17]

$(CB) = h(C) - h(B)$ (Height difference between points C, B)     [18]

$(DA) = h(D) - h(A)$ (Height difference between points D, A)     [19]

$(DB) = h(D) - h(B)$ (Height difference between points D, B)     [20]

$(C'A') = d(C) - d(A)$ (Displacement difference between C, A in the image)     [21]

$(C'B') = d(C) - d(B)$ (Displacement difference between C, B in the image)     [22]

$(D'A') = d(D) - d(A)$ (Displacement difference between D, A in the image)     [23]

$(D'B') = d(D) - d(B)$ (Displacement difference between D, B in the image)     [24]

Substituting [17], [18], [19], [20], [21], [22], [23], and [24] into equation [5] yields:

$$[h(C)-h(A)] = [d(C)-d(A)] * \frac{[h(C)-h(B)] * [d(D)-d(B)] * [h(D)-h(A)]}{[d(C)-d(B)] * [h(D)-h(B)] * [d(D)-d(A)]} \quad [25]$$

Solving for h(C) (the height at point C) yields:

$$h(C) = h(A) - \frac{\frac{h(B) * [d(C)-d(A)] * [d(D)-d(B)] * [h(D)-h(A)]}{[d(C)-d(B)] * [d(D)-d(A)] * [h(D)-h(B)]}}{1 - \frac{[d(C)-d(A)] * [d(D)-d(B)] * [h(D)-h(A)]}{[d(C)-d(B)] * [d(D)-d(A)] * [h(D)-h(B)]}} \quad [26]$$

Equation [26] solves for the unknown height h(C) in the general case (i.e. when h(A) and d(A) are not equal to zero). Substituting d(i) for d(C) into equation [26] yields:

$$h(i) = h(A) - \frac{\frac{h(B) * [d(i)-d(A)] * [d(D)-d(B)] * [h(D)-h(A)]}{[d(i)-d(B)] * [d(D)-d(A)] * [h(D)-h(B)]}}{1 - \frac{[d(i)-d(A)] * [d(D)-d(B)] * [h(D)-h(A)]}{[d(i)-d(B)] * [d(D)-d(A)] * [h(D)-h(B)]}} \quad [27]$$

A range imaging system which implements this equation is identical to that shown in FIG. 6. It is not necessary, in this case, to align the camera in such a way that the image of points at height h(A) are aligned on the first scan line.

Calibration of this system follows the same method set forth in Section D above. In this case, however, a three step, parallel plane calibration target is constructed as shown in FIG. 14. The lower plane, middle plane and top plane of the target are designated as A, B and D, respectively. The heights h(A) h(B) and h(D) are measured and stored in the computer memory.

The target is then placed on the scanning platform (or conveyor) as illustrated in FIG. 15. A complete range image is generated and the displacements of points lying on the planes A, B and D respectively, are saved in the lower section of the LUT EPROM as the values of d(A) d(B) and d(D), respectively.

Thereafter, the following look-up table generator program is run to generate the high section of the LUT EPROM contents:

```
BEGIN
    h(D) = Measured Physical Height of Plane D.
    h(B) = Measured Physical Height of Plane B.
    h(A) = Measured Physical Height of Plane A.
    d(D) = Measured Displacement of Plane D.
    d(B) = Measured Displacement of Plane B.
    d(A) = Measured Displacement of Plane A.

d(i) = 1 h(i) =
```

$$h(A) - \frac{\frac{h(B) * [d(i)-d(A)] * [d(D)-d(B)] * [h(D)-h(A)]}{[d(i)-d(B)] * [d(D)-d(A)] * [h(D)-h(B)]}}{1 - \frac{[d(i)-d(A)] * [d(D)-d(B)] * [h(D)-h(A)]}{[d(i)-d(B)] * [d(D)-d(A)] * [h(D)-h(B)]}}$$

```
    PRINT "EPROM ADDRESS" = d(i), "EPROM DATA" = h(i)
        d(i) = d(i) + 1
        IF d(i)<257 THEN
        GOTO 10
```

```
    ELSE
        STOP
END
```

It will be understood that the height h(i) at successive points along a light stripe may be determined in various alternative ways with the range imaging system according to the present invention. For example, instead of a look-up table LUT, a microcomputer can be provided to perform the calculation for each h(i), in accordance with equation [16] or [27], in dependence upon the values of h(A), h(B), h(D), d(A), d(B) and d(D) determined during calibration and stored in RAM.

Similarly, it is possible to store in a look-up table all of the possible values of h(i) and d(i) which are determined experimentally during an initial calibration. In this case, calibration of the system follows the same procedures as are outlined above, except that a "wedge" shaped calibration target is used as is illustrated in FIG. 16. With this type of target the height h(i) increases linearly from the minimum height h(A), which can be set equal to zero, to the maximum height h(D), which can be set equal to 256. The displacements d(A), d(2), d(3) ... d(i) ... d(D), are then measured during calibration and stored in the LUT EPROM for use by the system during operation.

There has thus been shown and described a novel laser range imaging system based on projective geometry which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. Apparatus for producing a range image of an area of the surface of an object, said apparatus comprising, in combination:
    (a) light source means for projecting a substantially planar light beam onto said object surface to illuminate said surface along a light stripe;
    (b) electronic camera means, arranged to view said object surface, as illustrated by said light beam, at an angle with respect to the plane of said light beam, for converting the viewed image into an electronic representation thereof which is divided into a plurality of picture scan elements;
    (c) electronic signal processing means, coupled to said electronic camera means, comprising:
        (1) means responsive to said electronic representation of said image, for determining the relative position, within said electronic representation, of the scan elements thereof corresponding to said light stripe on said object surface, said position determining means including means for counting the number of scan elements in said electronic representation of said image from a known line of said image to said scan elements corresponding to the image of said light stripe; and
        (2) table look-up means responsive to said position determining means for determining the height of said object surface at a plurality of points along said light stripe;

(3) means responsive to said height determining means for storing each height in association with its respective point of said object surface; and (d) means for moving at least one of (i) said object with respect to said light source means and said camera means and (ii) said light source means and said camera means with respect to said object, thereby to scan an area of said object surface with said planar light beam.

2. The apparatus defined in claim 1, wherein said light source means comprises:
(1) means for producing a pencil beam of light; and
(2) means for scanning said pencil beam in a substantially linear direction.

3. The apparatus defined in claim 2, wherein said scanning means includes a mirror having a mirror surface arranged in the path of said pencil beam, and means for moving said mirror to adjust the angle of incidence of said pencil beam with respect to said mirror surface.

4. The apparatus defined in claim 1, wherein said light source means comprises:
(1) means for producing a pencil beam of light; and
(2) means for spreading said pencil beam in a substantially linear direction.

5. The apparatus defined in claim 4, wherein said spreading means includes a cylindrical lens arranged in the path of said pencil beam.

6. The apparatus defined in claim 5, wherein said cylindrical lens has a cylinder axis which intersects and is transverse to said pencil beam.

7. The apparatus defined in claim 2, wherein said means for producing said pencil beam includes a laser.

8. The apparatus defined in claim 4, wherein said means for producing said pencil beam includes a laser.

9. The apparatus defined in claim 1, wherein said light source means projects said light beam in a direction generally perpendicular to said object surface.

10. The apparatus defined in claim 9, wherein said object surface has a minimum height which is generally planar, and wherein the plane of said light beam is substantially perpendicular to the minimum height plane of said object surface.

11. The apparatus defined in claim 1, wherein said electronic camera means comprises video camera means for scanning the viewed image and producing a video signal representing a plurality of horizontal scan lines.

12. The apparatus defined in claim 11, wherein said scan lines form said scan elements of said electronic representation.

13. The apparatus defined in claim 11, wherein said video camera is oriented such that said scan lines are substantially perpendicular to the image of said light stripe.

14. The apparatus defined in claim 1, wherein said camera means has a viewing axis which is arranged at an angle in the range of 10°-80° with respect to the plane of said light beam.

15. The apparatus defined in claim 1, wherein said position determining means includes means for counting the number of scan elements in said electronic representation of said image from the edge of said image to said scan elements corresponding to the image of said light stripe.

16. The apparatus defined in claim 15, wherein said position determining means further includes means for determining the presence of said light stripe image in said electronic representation of said viewed image.

17. The apparatus defined in claim 16, wherein said light stripe presence determining means include signal peak determining means for determining the peak of an electronic representation of said light stripe image.

18. The apparatus defined in claim 16, wherein said light stripe presence determining means include signal threshold means for determining when said electronic representation of said light stripe image exceeds a threshold.

19. The apparatus defined in claim 18, wherein said signal threshold means includes means for varying said threshold.

20. The apparatus defined in claim 16, wherein said light stripe presence determining means include signal centroid determining means for determining the centroid of an electronic representation of said light stripe image.

21. The apparatus defined in claim 15, wherein said counting means include means for generating clock pulses; a pulse counter, responsive to said pulse generator means, for counting said clock pulses during a prescribed period of time; sync generator means, coupled to said pulse generator means, to said camera means and to said pulse counter, for enabling said pulse counter at the beginning of a scan of said camera means; and light stripe detection means, responsive to said electronic representation of said image, for stopping said pulse counter when said light stripe is scanned by said camera means.

22. The apparatus defined in claim 1, wherein said table look-up means includes a table containing the height associated with each possible relative position.

23. The apparatus defined in claim 1, wherein said height determining means include means for storing the known, calibrated height of at least two points (B, D) of different height.

24. The apparatus defined in claim 23, wherein said height determining means include means for storing the known, calibrated height of at least three points (A,B,D) of different height.

25. The apparatus defined in claim 24, wherein points A and D are at substantially minimum and maximum viewing height, respectively, of said camera means, and point B is substantially mid-height between points A and D.

26. The apparatus defined in claim 1, wherein said light source means and said camera means are immovably mounted with respect to each other, and wherein said moving means includes conveyor means for moving said object past said planar light beam.

27. The apparatus defined in claim 1, wherein said light source means and said camera means are mounted on a common support, and wherein said moving means include means for moving said common support past said object so as to scan an area of said object surface with said planar light beam.

28. The apparatus defined in claim 22, further comprising target means, positionable as said object, for calibrating said apparatus, said target means having a different, known height associated with each possible relative position.

29. The apparatus defined in claim 28, wherein said target means is in the shape of a wedge.

30. The apparatus defined in claim 6, wherein said camera means has a viewing axis which is arranged at an angle of 10°-80° with respect to the plane of said light beam.

31. The apparatus defined in claim 30, wherein said cylindrical lens has an optical axis arranged in line with said pencil beam, and wherein said viewing axis of said camera is perpendicular to said optical axis.

32. The apparatus defined in claim 18, wherein said signal threshold means is a Schmitt Trigger circuit.

33. The apparatus defined in claim 1, wherein said signal processing means is continuously operative to repeatedly process and store successive range images of the object surface viewed by said camera means.

34. The apparatus defined in claim 1, wherein said signal processing means is responsive to an externally generated trigger signal to process and store a single range image of the object surface viewed by said camera means.

35. The apparatus defined in claim 1, wherein said signal processing means include a mode switch which is switchable into asynchronous mode and synchronous mode positions, respectively:
   wherein said signal processing means is continuously operative, when said mode switch is placed in the asynchronous mode position, to repeatedly process and store successive range images of the object surface viewed by said camera means; and
   wherein said signal processing means is operative, in response to the setting of said mode switch in the synchronous mode position and to an externally generated trigger signal, to process and store a single range image of the object surface viewed by said camera means.

36. The apparatus defined in claim 1, wherein said moving means includes means for varying the speed with which said object is moved with respect to said light source means and said camera means, thereby to vary the pixel density of the scanned image in the direction of scan.

37. Apparatus for producing a range image of an area of the surface of an object, said apparatus comprising, in combination:
   (a) light source means for projecting a substantially planar light beam onto said object surface to illuminate said surface along a light stripe;
   (b) electronic camera means, arranged to view said object surface, as illuminated by said light beam, at an angle with respect to the plane of said light beam, for converting the viewed image into an electronic representation thereof which is divided into a plurality of picture scan elements;
   (c) electronic signal processing means, coupled to said electronic camera means, comprising:
      (1) means, responsive to said electronic representation of said image, for determining the relative position, within said electronic representation, of the scan elements thereof corresponding to said light stripe on said object surface;
      (2) means responsive to said position determining means for determining the height of said object surface at a plurality of points along said light stripe, said height determining means including means for determining the height (h) of said object surface at a plurality of points (1, 2, 3 . . . i . . . N) along said light stripe in dependence upon the heights (h(A), h(B), h(D)) of three known points (A,B,D) and the cross ratio (d(A), d(B), d(i), d(D)) with respect to point i, where "d" is the position of the respective point;
      (3) means responsive to said height determining means for storing each height in association with its respective point on said object surface; and
   (d) means for moving said object with respect to said light source means and said camera means so as to scan an area of said object surface with said planar light beam.

38. The apparatus defined in claim 37, wherein said heights of said three known points (A, B, D) are, respectively, at substantially minimum height viewable by said camera means, at substantially intermediate height between said minimum and maximum heights viewable by said camera means, and at substantially maximum height viewable by said camera means.

39. The apparatus defined in claim 37, wherein said height h(i) is determined in accordance with the formula:

$$h(i) = \frac{d(i)*h(B)*h(D)*[d(D)-d(B)]}{[d(i)*h(D)*[d(D)-d(B)]]-[[d)(i)-d(B)]*[h(D)-h(B)]*d(D)]} \qquad [16]$$

where $d(A)=h(A)=0$.

40. The apparatus defined in claim 39, wherein the height h(i) associated with each point (i) is stored in a look-up table in association with the number of scan elements d(i) associated with that point.

41. The apparatus defined in claim 37, wherein said height h(i) is determined in accordance with the formula:

$$h(i) = \frac{h(A) - \frac{h(B)*[d(i)-d(A)]*[d(D)-d(B)]*[h(D)-h(A)]}{[d(i)-d(B)]*[d(D)-d(A)]*[h(D)-h(B)]}}{1 - \frac{[d(i)-d(A)]*[d(D)-d(B)]*[h(D)-h(A)]}{[d(i)-d(B)]*[d(D)-d(A)]*[h(D)-h(B)]}} \qquad [27]$$

42. The apparatus defined in claim 37, wherein said height determining means includes:
   (i) means for precalculating the height h(i) at a plurality of points, with each point i associated with a different scan element d(i) of said electronic representation;
   (ii) means for storing said precalculated heights h(i) in association with their respective scan elements d(i); and
   (iii) means, coupled to said position determining means and responsive to the scan element position d(i) corresponding to said light stripe, for retrieving from said storage means the precalculated height h(i) of said light stripe at point i.

43. The apparatus defined in claim 42, wherein said precalculating means calculates the height h(i) at each point i in accordance with the formula:

$$h(i) = \frac{h(A) - \frac{h(B)*[d(i)-d(A)]*[d(D)-d(B)]*[h(D)-h(A)]}{[d(i)-d(B)]*[d(D)-d(A)]*[h(D)-h(B)]}}{1 - \frac{[d(i)-d(A)]*[d(D)-d(B)]*[h(D)-h(A)]}{[d(i)-d(B)]*[d(D)-d(A)]*[h(D)-h(B)]}} \qquad [27]$$

44. The apparatus defined in claim 43, wherein $d(A)=h(A)=0$.

45. The apparatus defined in claim 37, wherein said height determining means includes means, coupled to said position determining means and responsive to the scan element position d(i) corresponding to said light stripe, for calculating the height h(i) of said light stripe at point i.

46. The apparatus defined in claim 45, wherein said calculating means calculates the height h(i) at point i in accordance with the formula $$h(i) = h(A) - \frac{\frac{h(B) * [d(i)-d(A)] * [d(D)-d(B)] * [h(D)-h(A)]}{[d(i)-d(B)] * [d(D)-d(A)] * [h(D)-h(B)]}}{1 - \frac{[d(i)-d(A)] * [d(D)-d(B)] * [h(D)-h(A)]}{[d(i)-d(B)] * [d(D)-d(A)] * [h(D)-h(B)]}}. \quad [27]$$

47. The apparatus defined in claim 46, wherein d(A)=h(A)=0.

48. The apparatus defined in claim 37, wherein d(i) is the number of scan elements from the edge of said electronic representation of the respective point i.

49. The apparatus defined in claim 37, further comprising target means, positionable as said object, for calibrating said apparatus, said target means having at least two known heights h(B) and h(C).

50. The apparatus defined in claim 49, wherein h(A)=0 and h(B) and h(C) are at substantially mid and maximum viewing heights, respectively of said camera means.

51. The apparatus defined in claim 49, wherein said target means has three known heights h(A), h(B) and h(C).

52. The apparatus defined in claim 51, wherein h(A), h(B) and h(C) are at substantially minimum, mid and maximum heights, respectively, of said camera means.

53. The apparatus defined in claim 42, wherein said storage means is an electrically programmable read only memory (EPROM).

54. The apparatus defined in claim 37, wherein said light source means comprises:
    (1) means for producing a pencil beam of light; and
    (2) means for scanning said pencil beam in a substantially linear direction.

55. The apparatus defined in claim 54, wherein said scanning means includes a mirror having a mirror surface arranged in the path of said pencil beam, and means for moving said mirror to adjust the angle of incidence of said pencil beam with respect to said mirror surface.

56. The apparatus defined in claim 37, wherein said light source means comprises:
    (1) means for producing a pencil beam of light; and
    (2) means for spreading said pencil beam in a substantially linear direction.

57. The apparatus defined in claim 56, wherein said spreading means includes a cylindrical lens arranged in the path of said pencil beam.

58. The apparatus defined in claim 57, wherein said cylindrical lens has a cylinder axis which intersects and is transverse to said pencil beam.

59. The apparatus defined in claim 54, wherein said means for producing said pencil beam includes a laser.

60. The apparatus defined in claim 56, wherein said means for producing said pencil beam includes a laser.

61. The apparatus defined in claim 37, wherein said light source means projects said light beam in a direction generally perpendicular to said object surface.

62. The apparatus defined in claim 61, wherein said object surface has a minimum height which is generally planar, and wherein the plane of said light beam is substantially perpendicular to the minimum height plane of said object surface.

63. The apparatus defined in claim 37, wherein said electronic camera means comprises video camera means for scanning the viewed image and producing a video signal representing a plurality of horizontal scan lines.

64. The apparatus defined in claim 63, wherein said scan lines form said scan elements of said electronic representation.

65. The apparatus defined in claim 63, wherein said video camera is oriented such that said scan lines are substantially perpendicular to the image of said light stripe.

66. The apparatus defined in claim 37, wherein the viewing axis of said camera means is arranged at an angle in the range of 10°-80° with respect to the plane of said light beam.

67. The apparatus defined in claim 37, wherein said position determining means includes means for counting the number of scan elements in said electronic representation of said image from the edge of said image to said scan elements corresponding to the image of said light stripe.

68. The apparatus defined in claim 67, wherein said position determining means further includes means for determining the presence of said light stripe image in said electronic representation of said viewed image.

69. The apparatus defined in claim 68, wherein said light stripe presence determining means include signal peak determining means for determining the peak of an electronic representation of said light stripe image.

70. The apparatus defined in claim 68, wherein said light stripe presence determining means include signal threshold means for determining when said electronic representation of said light stripe image exceeds a threshold.

71. The apparatus defined in claim 70, wherein said signal threshold means includes means for varying said threshold.

72. The apparatus defined in claim 68, wherein said light stripe presence determining means include signal centroid determining means for determining the centroid of an electronic representation of said light stripe image.

73. The apparatus defined in claim 67, wherein said counting means include means for generating clock pulses; a pulse counter, responsive to said pulse generator means, for counting said clock pulses during a prescribed period of time; sync generator means, coupled to said pulse generator means, to said camera means and to said pulse counter, for enabling said pulse counter at the beginning of a scan of said camera means; and light stripe detection means, responsive to said electronic representation of said image, for stopping said pulse counter when said light stripe is scanned by said camera means.

74. The apparatus defined in claim 37, wherein said height determining means include means for storing the known, calibrated height of at least two points (B, D) of different height.

75. The apparatus defined in claim 74, wherein said height determining means include means for storing the known, calibrated height of at least three points (A,B,D) of different height.

76. The apparatus defined in claim 75, wherein points A and D are at substantially minimum and maximum viewing height, respectively, of said camera means, and point B is substantially mid-height between points A and D.

77. The apparatus defined in claim 37, wherein said light source means and said camera means are immovably mounted with respect to each other, and wherein said moving means includes conveyor means for moving said object past said planar light beam.

78. The apparatus defined in claim 37, wherein said light source means and said camera means are mounted on a common support, and wherein said moving means include means for moving said common support past said object so as to scan an area of said object surface with said planar light beam.

79. A method of calibrating apparatus for producing a range image of an area of the surface of an object, said method comprising the step of:
  (a) viewing a target object having a surface with at least three known heights h(A), h(B) and h(D) at different points A, B and D along a light stripe, and producing an electronic representation of said target object along said light stripe which is divided into a plurality of picture scan elements; and
  (b) determining the relative positions, d(A), d(B) and d(D), within said electronic representation of the scan elements thereof, of said target object surface at said known heights h(A), h(B) and h(D).

80. The method defined in claim 79, wherein the height h(A) of point A equals 0, and wherein said target object is viewed such that said relative position d(A) equals 0.

81. The method defined in claim 79, further comprising the steps of determining the height h(i) of a point i at each possible relative position d(i), and storing said heights in a look-up table.

82. The method defined in claim 81, wherein said heights h(i) are determined in accordance in the formula:

$$h(i) = \frac{h(A) - \frac{h(B) * [d(i)-d(A)] * [d(D)-d(B)] * [h(D)-h(A)]}{[d(i)-d(B)] * [d(D)-d(A)] * [h(D)-h(B)]}}{1 - \frac{[d(i)-d(A)] * [d(D)-d(B)] * [h(D)-h(A)]}{[d(i)-d(B)] * [d(D)-d(A)] * [h(D)-h(B)]}} \quad [27]$$

83. The method defined in claim 82, wherein the height h(A) of point A equals 0, and wherein said target object is viewed such that said relative position d(A) equals 0.

84. The method defined in claim 82, further comprising the steps of determining the height h(i) of a point i at each possible relative position d(i), and storing said heights in a look-up table.

85. A method for producing a range image of an area of the surface of an object, said method comprising the steps of:
  (a) projecting a substantially planar light beam onto said object surface to illuminate said surface along a light stripe;
  (b) viewing said object surface, as illuminated by said light beam, at an angle with respect to the plane of said light beam and converting the viewed image into an image representation thereof which is divided into a plurality of picture scan elements;
  (c) determining the relative positions, within said representation, of the scan elements thereof corresponding to said light stripe on said object surface;
  (d) determining the height of said object surface at a plurality of points along said light stripe by means of the following steps:
    (1) determining the height of at least three points (A,B,D) of different height within the field of view of said object surface, as illuminated by said light beam; and
    (2) calculating from said known heights and from the relative positions, within said image representation, of the scan elements thereof corresponding to said light stripe on said object surface, the height h(i) of said object surface at each point (i) a plurality of points along said light stripe being calculated according to the formula:

$$h(i) = \frac{h(A) - \frac{h(B) * [d(i)-d(A)] * [d(D)-d(B)] * [h(D)-h(A)]}{[d(i)-d(B)] * [d(D)-d(A)] * [h(D)-h(B)]}}{1 - \frac{[d(i)-d(A)] * [d(D)-d(B)] * [h(D)-h(A)]}{[d(i)-d(B)] * [d(D)-d(A)] * [h(D)-h(B)]}}$$

where d(i) is the number of scan elements from the edge of the image representation to each respective point i; and
  (e) moving said object with respect to said planar light beam so as to scan an area of said object surface with said light beam.

86. The method defined in claim 85, wherein said height h(i) at each point (i) is calculated according to the formula:

$$h(i) = \frac{h(A) - \frac{h(B) * [d(i)-d(A)] * [d(D)-d(B)] * [h(D)-h(A)]}{[d(i)-d(B)] * [d(D)-d(A)] * [h(D)-h(B)]}}{1 - \frac{[d(i)-d(A)] * [d(D)-d(B)] * [h(D)-h(A)]}{[d(i)-d(B)] * [d(D)-d(A)] * [h(D)-h(B)]}} \quad [27]$$

where d(i) is the number of scan elements from the edge of the image representation to each respective point i.

87. The method defined in claim 86, wherein said viewing step is carried out such that d(A)=h(A)=0 in the viewed image.

* * * * *